(12) United States Patent
Wilt

(10) Patent No.: US 8,095,746 B1
(45) Date of Patent: Jan. 10, 2012

(54) CONSERVING AND SHAPING ADDRESS SPACE WITH ARRAYS

(75) Inventor: Nicholas Patrick Wilt, Rochester, NY (US)

(73) Assignee: NVIDIA Corporation, Santa Clara, CA (US)

(*) Notice: Subject to any disclaimer, the term of this patent is extended or adjusted under 35 U.S.C. 154(b) by 771 days.

(21) Appl. No.: 12/030,844

(22) Filed: Feb. 13, 2008

(51) Int. Cl.
  *G06F 12/00* (2006.01)
(52) U.S. Cl. .................................. 711/154; 345/619
(58) Field of Classification Search .................. 711/154; 345/619
  See application file for complete search history.

(56) References Cited

U.S. PATENT DOCUMENTS

| | | | |
|---|---|---|---|
| 5,852,443 A * | 12/1998 | Kenworthy | 345/441 |
| 6,326,964 B1 * | 12/2001 | Snyder et al. | 345/419 |
| 6,480,200 B1 * | 11/2002 | Fisher et al. | 345/582 |
| 6,996,171 B1 * | 2/2006 | Walker et al. | 375/240.09 |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Eggers, et al., "Simultaneous Multithreading: A Platform for Next-Generation Processors," *IEEE Micro*, vol. 17, No. 5, pp. 12-19, Sep./Oct. 1997.
Moss, et al. "Toward Acceleration of RSA Using 3D Graphics Hardware," LNCS 4887, Dec. 2007, pp. 369-388.

* cited by examiner

*Primary Examiner* — Hashem Farrokh
(74) *Attorney, Agent, or Firm* — Patterson & Sheridan, LLP

(57) ABSTRACT

A system and method for using an array structure to abstract the addressing of device memory allows for larger amounts of device memory to be accessed compared with using conventional pointers to access a 32 bit memory space. Additionally, the memory organization may be changed for optimal performance based on the underlying memory subsystem and characteristics of the accesses without impacting the array structure.

19 Claims, 5 Drawing Sheets

CONSERVING AND SHAPING ADDRESS SPACE WITH ARRAYS

FIELD OF THE INVENTION

Embodiments of the present invention relate generally to addressing memory, and more specifically to using an array structure to abstract the addressing of memory.

DESCRIPTION OF THE RELATED ART

Segmented memory architectures are typically referenced using a 32-bit address space. When a subroutine is called, the global pointers specifying the address space that the subroutine will access must be obtained to determine the memory segment locations and change the segment locations as needed to ensure correct execution of the subroutine.

Accordingly, what is needed in the art is a system and method for addressing large amounts of memory without obtaining the memory segment locations when subroutines are executed.

SUMMARY OF THE INVENTION

A system and method for addressing large amounts of memory allows subroutines to execute without obtaining the memory segment locations. An array structure is used to abstract the addressing of device memory allows for larger amounts of device memory to be accessed compared with using conventional pointers to access a 32 bit memory space. Additionally, the memory organization may be changed for optimal performance based on the underlying memory subsystem and characteristics of the accesses without impacting the array structure.

Various embodiments of a method of the invention for executing a kernel program that writes an array stored in device memory include invoking the kernel program, inserting commands into a command stream for execution by a multithreaded processor that cause the kernel to correctly infer a location of the array in the device memory, executing the kernel program to produce data, and writing the array stored in the device memory an index to store the data in the array.

Various embodiments of a method of the invention for conserving address space in device memory include allocating segments of the device memory to an array and obtaining a handle corresponding to a location in the device memory where the array is stored, wherein a size of the array is not limited by a size of the address space. A reference is bound to the array, the reference including an attribute that controls how data stored in the array interpreted by a multithreaded processor. A kernel program is executed to produce the data the data is written in by specifying an index to the array.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
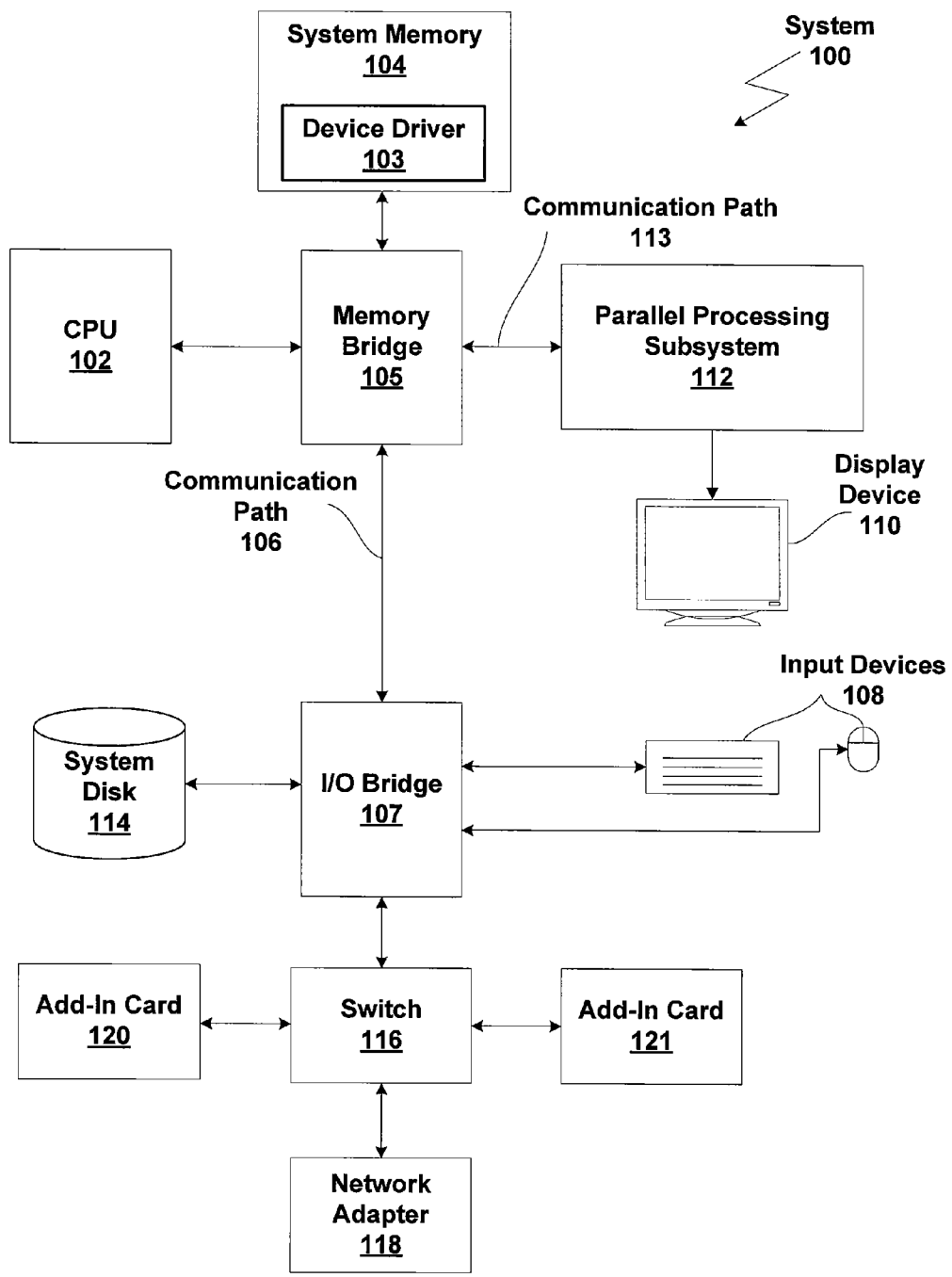
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A device driver 103 that is stored in system memory 104, interfaces between processes executed by CPU 102, such as application programs, and parallel processing subsystem 112, translating program instructions as needed for execution by parallel processing subsystem 112.

Device driver 103 may be used to set up arrays to allocate segments of memory in parallel processing subsystem 112. The segments of memory are accessed by application programs executed by CPU 102 and parallel processing subsystem 112. An array structure is used to access device memory within parallel processing subsystem 112, avoiding the constraints of the conventional 32 bit memory addressing. Kernel programs executed by parallel processing subsystem 112 reference data stored in the device memory by specifying indices for the array. Unlike conventional memory segments, the amount of memory accessible using arrays is not limited by a 32 bit memory space. Therefore, the arrays may be used to access a device memory space that is larger than four Gigabytes. Device memory accesses using arrays have better locality for high performance while allowing for a greater addressable device memory space. In some embodiments of the present invention, an array may contain as many as 2048× 2048×2048 elements, where each element can be up to 16 bytes in size. Kernels may reference different arrays and the number of arrays that may be referenced by an application is limited only by the pointer width of CPU 102 and the native pointer size of parallel processing subsystem 112. In some embodiments of the present invention, the native pointer size is 40 bits, allowing for one terabyte of addressable memory.

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
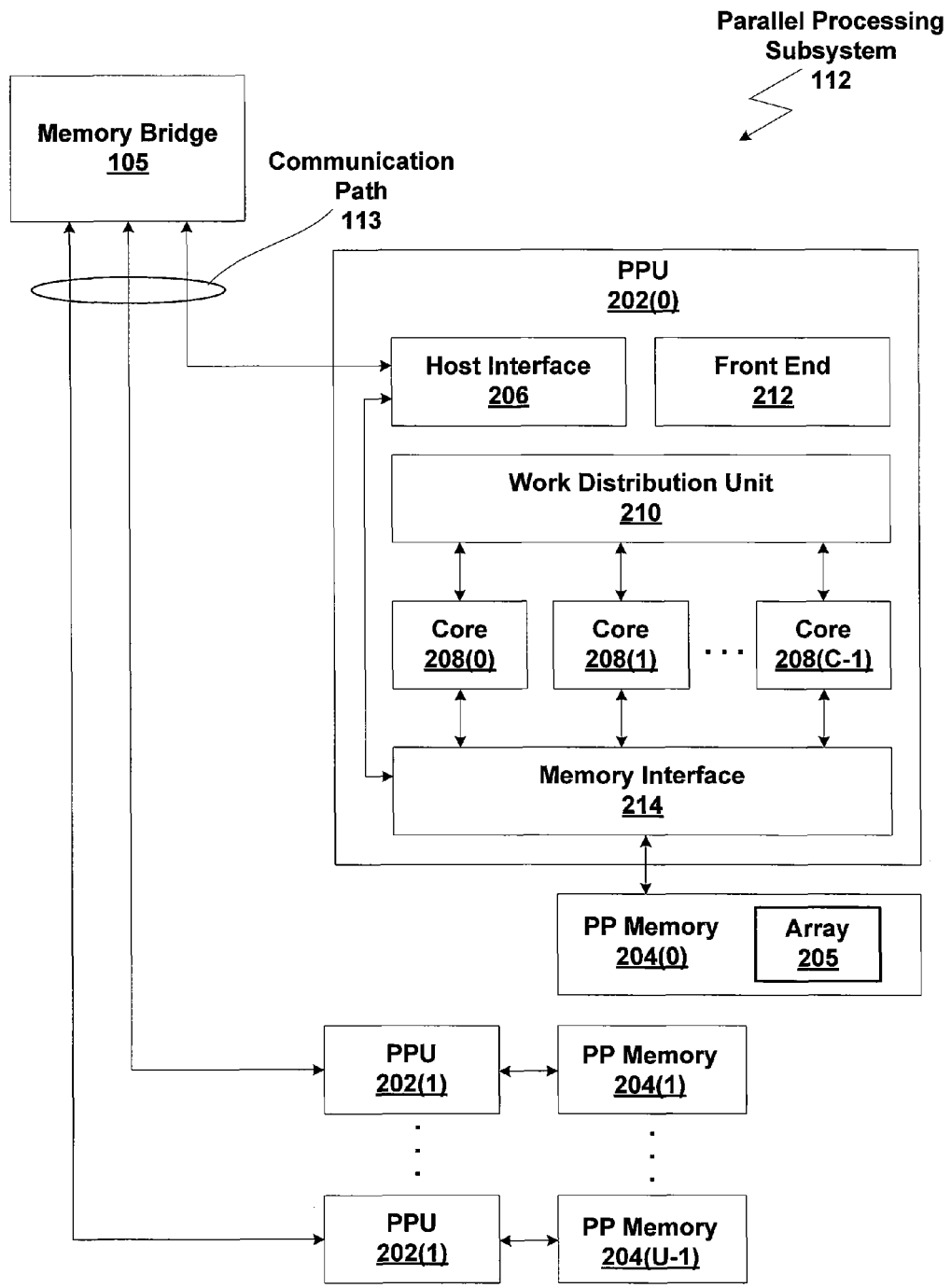
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores 208 to communicate with system memory 104 or other memory that is not local to PPU 202.

Local PP memory 204 provides the device memory and includes one or more arrays 205 that store data. Cores 208 are configured to support an arbitrary memory layout in order to shape the memory accesses as needed to best use the available memory bandwidth between PPU 202 and PP memory 204. Different memory layouts may be used to store the data in order to minimize page boundary crossings and the like. However, the array interface provides a consistent method for accessing memory within a kernel program through the use of indices instead of conventional pointers. The indices are independent of the specific memory layout. When a read request is received from a core 208, memory interface 214 first performs any mapping specified by memory shaping and then completes a virtual to physical address mapping to produce a physical address for the read request. In conventional memory systems, segments may be relocated by the operating system, and associated pointers are updated accordingly. The array indices provide a level of abstraction so that the indices are independent of the actual location of the data in memory. Device memory is also available to kernels as conventional linear addressable memory that is not accessed through arrays.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have its own dedicated PP memory device(s) 204 or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102. Therefore, PPU 202 may be configured to offload processing from CPU 102 to increase the processing throughput and/or performance of system 100.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs in a multi-PPU system may be identical to or different from each other; for instance, different PPUs might have different numbers of cores, different amounts of local PP memory, and so on. Where multiple PPUs 202 are present, they may be operated in parallel to process data at higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Core Overview

PPU 202 includes a core 208 (or multiple cores 208) configured to execute a large number of threads in parallel, where the term "thread" refers to an instance of a context, i.e., a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, 32, etc.) parallel processing engines configured to receive SIMD instructions from a single instruction unit. Each processing engine advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, reduction operations, and computation of various algebraic functions (e.g., planar interpolation, trigonometric, exponential, and logarithmic functions, etc.); and the same functional-unit hardware can be leveraged to perform different operations.

In one embodiment, each processing engine is multithreaded and can execute up to some number G (e.g., 32) of threads concurrently. The processing engines are advantageously designed to switch rapidly from one thread to another so that instructions from different threads can be issued in any sequence without loss of efficiency. Since each thread may correspond to a different context, multiple contexts may be processed over multiple cycles as different threads are issued for each cycle.

For any given processing cycle, an instruction (INSTR) is issued to the P processing engines. Each processing engine may receive a different instruction for any given processing cycle when multiple contexts are being processed simultaneously. When all P processing engines process a single context, core 208 implements a P-way SIMD microarchitecture. Since each processing engine is also multithreaded, supporting up to G threads concurrently, core 208 in this embodiment can have up to P*G threads executing concurrently. For instance, if P=16 and G=24, then core 208 supports up to 384 concurrent threads for a single context or N*24 concurrent threads for each context, where N is the number of processing engines allocated to the context.

Operation of core 208 is advantageously controlled instructions read from pushbuffers defining how the data is to be processed (e.g., what program is to be executed). Each new context is initialized, and then cores 208 begin executing the context. When execution of a context is completed output data may be retrieved from a shared memory within core 208 or written to PP memory 204.

It will be appreciated that the core architecture described herein is illustrative and that variations and modifications are possible. Any number of processing engines may be included. A PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and the like.

Conserving and Shaping Address Space

PPU 202 may be configured to form a graphics processing pipeline with one or more cores 208 configured to perform the functions of a vertex processing unit, geometry processing unit, and/or a fragment processing unit. Other graphics processing functions such as, primitive assembly, rasterization, and raster operations may also be performed by core 208 or may be performed by host interface 206. Graphics programs, such as vertex programs, geometry program, and shader programs include kernel programs as subroutines. In other embodiments of the present invention, PPU 202 may be configured to perform other data processing functions, particularly compute-intensive, highly parallel computations, such as general signal processing, physics simulation, computational finance or biology, and the like. The kernel programs reference one or more arrays 205 in order to process data during execution of the programs.

Device memory, e.g., PP memory 204, may be allocated either as linear memory using conventional methods, or as arrays, such as CUDA (Compute Unified Device Architecture) arrays provided by CUDA products distributed by NVIDIA Corporation. Linear memory exists in the conventional 32-bit address space, so separately allocated entitites can reference one another via pointers. Both linear memory and arrays are readable and writable by the host, e.g., CPU 102.

CUDA arrays are opaque memory layout optimized for texture fetching. They are one-dimensional or two-dimensional and composed of elements, each of which has 1, 2, or 4 components that may be signed or unsigned 8-, 16-, or 32-bit integers, 16-bit floats, or 32-bit floats. CUDA arrays are read by kernel programs through texture fetching. In some embodiments of the present invention, core 208 may read arrays, including CUDA arrays during the execution of a kernel program for texture data and other types of data, e.g. vertex, primitive, pixel, and the like.

Figure 3:
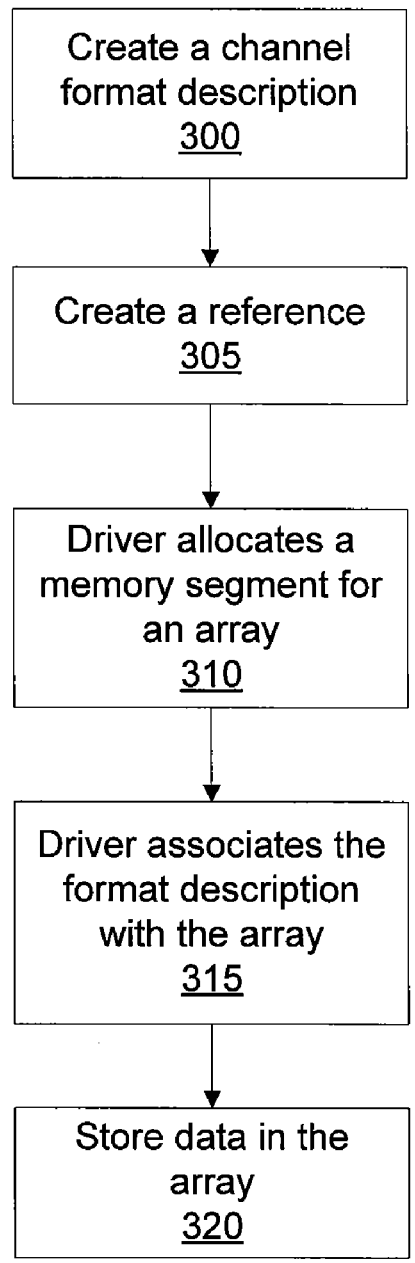
FIG. 3 is a flow diagram of method steps for setting up an array in accordance with one or more aspects of the present invention.

FIG. 3 is a flow diagram of method steps for setting up array 205, in accordance with one or more aspects of the present invention. In step 300 a channel format description is created. In some embodiments of the present invention, CreateChannelDesc( ) is called: CreateChannelDesc (int x, int y, int z, int w, enum ChannelFormatKind f); to return a channel descriptor with format f and number of bits of each component x, y, z, and w.

Arrays may be used to access texture data, in which case, a texture reference is used to define the part of texture memory that is read (fetched). The first parameter of a texture read specified an object called a texture reference. In step 305 a reference is created that includes the channel descriptor. The code shown in TABLE 1 may be used to define a texture reference structure:

TABLE 1

```
Struct textureReference
{
    int                              normalized;
    enum    TextureFilterMode        filterMode;
    enum    TextureAddressMode       addressMode[2];
    struct  ChannelFormatDesc        channelDesc;
}
```

A texture reference provides a channel descriptor that defines which part of texture memory is read and the texture reference is bound to some region of memory, called a texture, before it can be used by a kernel program. Several distinct texture references might be bound to the same texture or to textures that overlap in memory. A reference, such as a texture reference, has several attributes that control how the data is accessed and interpreted. Exposing the hardware capability through references provides the programming model with flexibility.

A first attribute of a reference is the dimensionality that specified whether the data is addressed as a one-dimensional array using one coordinate, or as a two-dimensional array using two coordinates. Elements of the array bound to a texture reference are called texels (texture elements). Other attributes define the input and output data types of the reference, as well as how the input coordinates are interpreted and what processing should be performed by core 208.

Some of the attributes of a texture reference are specified when declaring the texture reference and are known at compile time. A texture reference is declared as a variable of type texture: "Texture<Type, Dim, ReadMode> texRef;" Type specifies the type of data that is returned when fetching the texture. Dim specified the dimensionality of the texture reference and is equal to 1 or 2. ReadMode specifies the format of the value that is returned, signed or unsigned, floating point or integer.

Other attributes of a texture reference may be changed at runtime, such as whether texture coordinates are normalized or not, the addressing mode, and texture filtering. In other embodiments of the present invention, attributes may include whether or not the reference is compressed or not and the type of compression that is used. The addressing mode defines what happens when texture coordinates are out of range. When using unnormalized texture coordinates, texture coordinates outside the range [0,N), where N is the size of the texture in the dimension corresponding to the coordinate, are clamped: Values below 0 are set to 0 and values greater or equal to N are set to N−1. Clamping is also the default addressing mode when using normalized texture coordinates: Values below 0.0 or above 1.0 are clamped to the range [0.0, 1.0). For normalized coordinates, the "wrap" addressing mode also may be specified. Wrap addressing is usually used when the texture contains a periodic signal. It uses only the fractional part of the texture coordinate; for example, 1.25 is treated the same as 0.25 and −1.25 is treated the same as 0.75. Linear texture filtering may be performed on the texel data that is read to produce interpolated texel values using neighboring texels.

In step 310 driver 103 allocates one or more segments of device memory, e.g., PP memory 204 to array. Arrays are allocated using MallocArray( ) and freed using FreeArray( ) MallocArray( ) allocates an array according to a format description structure created using CreateChannelDesc( ) and returns a handle to the new array. The code shown in TABLE 2 may be used to allocate a width×height array of one 32-bit floating-point component and return the handle, &cuArray:

TABLE 2

```
ChannelFormatDesc channelDesc = CreateChannelDesc<float> ( );
Array* cuArray;
MallocArray (&cuArray, &channelDesc, width, height);
```

Before a kernel program can use a texture reference to read from memory, the texture reference is bound to a texture using BindTextureToArray( ) In step 315 device driver 103 associates the reference specified by the channel format with the array to bind the reference to the array. The code shown in TABLE 3 binds a texture reference to an array, cuArray:

TABLE 3

```
Texture<float, 2, ReadModeElement Type> texRef;
Texture Reference* texRefPtr;
GetTextureReference(&texRefPtr, "texRef");
ChannelFormatDesc channelDesc;
GetChannelDesc (&channelDesc, cuArray);
BindTextureToArray (texRef, cuArray, &channelDesc);
```

The format specified when binding a texture to a texture reference should match the parameters specified when declaring the texture reference; otherwise, the results of texture fetches may be undefined. BindTextureArray binds cuArray to the texture reference texRef. The channelDesc describes how the memory is interpreted when values are read from cuArray.

In step 320 driver 103 stores data in the array. The data will be read during execution of a graphics program that includes kernel programs (subroutines) with arrays as inputs and/or outputs. As previously described, attributes of the reference may be specified to define how the data is processed.

Figure 4:
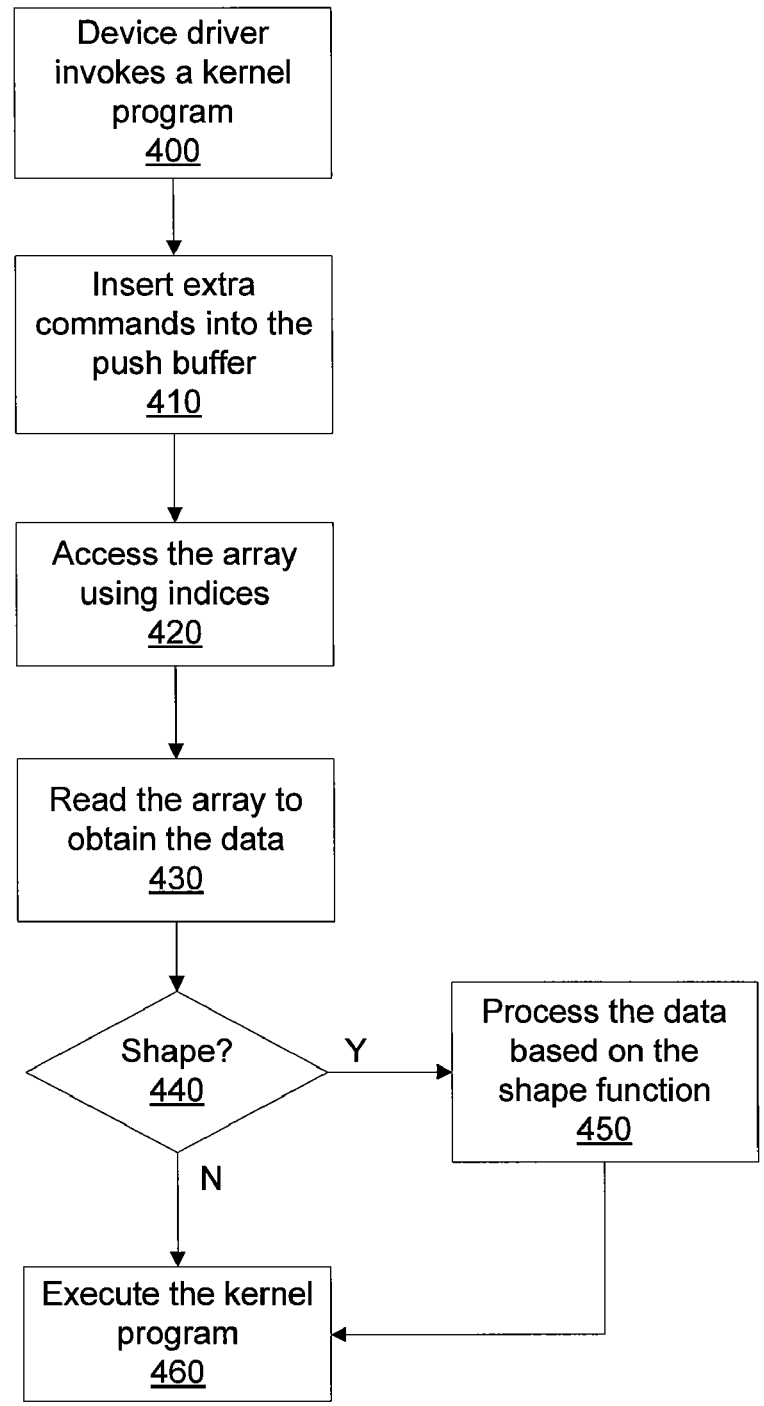
FIG. 4 is a flow diagram of method steps for executing a kernel and accessing an array in accordance with one or more aspects of the present invention.

FIG. 4 is a flow diagram of method steps for executing a kernel program and accessing an array, in accordance with one or more aspects of the present invention. In step 400 device driver 103 invokes a kernel program that calls array 205. In step 410 device driver 103 inserts extra commands into the push buffer that includes the kernel program instructions. These commands, such as SET_TEX_SAMPLER_POOL and SET_TEX_HEADER_POOL commands, cause the kernel to correctly infer the location, format, layout, and interpretation of the array when executing kernel instructions such as TEX that read the array. Taken together, texture headers and samplers directly correspond to the "texture reference" object in a CUDA application program. The kernel instructions contain an immediate operand that specifies the index of the header and sampler from which to infer the location, format and interpretation of the array. By specifying different sets of headers and samplers, or by modifying the contents of the headers and samplers before invoking the kernel program, the driver can exert considerable influence over the behavior of the kernel program instructions when reading and/or writing arrays with few or no changes to the kernel program's code.

In step 420, during execution of the push buffer, PPU 202 accesses array 205 using indices. The indices may be validated using the dimensions of array 205. When conventional memory segmentation is used without array structures, a subroutine, such as a kernel program, inherits the memory segmentation state of the program calling the subroutine. The subroutine first obtains the pointers to locations in the 32 bit memory and determines if the pointers and memory segmentation state is set up properly for execution of the subroutine. In order to begin execution and during execution the subroutine may modify the memory segmentation state.

In contrast, when array structures are used the kernel program does not obtain pointers and verify the memory segmentation state. Instead, the kernel program uses the indices to access data stored in array 205. Pointers are not referenced by the kernel program and any necessary remapping of the memory address space is hidden from the kernel program and performed by cores 208 and/or memory interface 214. This preserves the flexibility for changing the memory organization for optimal performance based on the underlying memory subsystem and characteristics of the accesses. As previously described, the address computations may be arbitrarily complex without impacting the indices. Additionally, the arrays are not limited in size by the 32 bit memory size of conventional segmented memory systems.

In step 430 PPU 202 reads the memory segment(s) to obtain the data stored in array 205. In step 440, core(s) 208 determine if processing of the data read from array 205 should be shaped, i.e., processed based on attributes specified for the reference that is bound to array 205. Examples of shaping that may be specified include filtering functions, decompression, format conversion, and the like. If, in step 440 core(s) 208 determine that shaping is specified, then in step 450 core(s) 208 process the data based on the shape function and proceed to step 460. Otherwise, core(s) 208 proceed directly to step 460 and execute the kernel program using the data read from array 205.

Shaping Address Space By Writing Arrays

In addition to read from arrays, kernel programs may also write arrays. Just as a reference, such as a texture reference, has several attributes that control how the data is processed by core 208 after it is read, attributes may also control how the data is processed by core 208 before the data is stored in the array. Exposing the hardware capability through references provides the programming model with flexibility. For example, attributes define the format of data written to the array, including compression formats that may be dynamically enabled or disabled for specific tiles within an array as the data varies during processing. An attribute may also be used to perform blending operations, associative operations (xor, min, max, and the like), masking, or control anti-aliasing by specifying a number of sub-pixel samples and a sub-pixel sample pattern.

The code shown in TABLE 4 reads a one dimensional array, A and writes another one dimensional array, C. Data read from array A may be shaped based on attributes specified by a read shape and the result of VectorScale, array C may be further processed based on attributes specified by a write shape prior to being written in device memory.

TABLE 4

```
Void VectorScale( Array<float> C, const Array<float> A, float f, int N )
{
    for ( int i = threadIdx.x; i<N; i+= blockDim.x )
        C[i] =A [i]*f;
}
```

In contrast, when conventional 32-bit pointers are used to access the segmented memory, the code references the pointers, as shown in TABLE 5. Before the conventional VectorScale is executed the memory segment locations are obtained to confirm that the memory space is properly referenced for the correct execution of the conventional VectorScale. The indices may be validated using the dimensions of array 205. A different response for invalid indices may be specified for each different kernel program. For example, a first kernel program may return a value of zero when invalid indices are detected and a second kernel program may indicate an exception.

TABLE 5

```
Void VectorScale( float *out, const float *in, float f, int N )
{
    for ( int i = threadIdx.x; i<N; i+= blockDim.x )
        out[i] = in[i]*f;
}
```

The code shown in TABLE 6 reads a two dimensional array, A, scales the array by f and writes the result to another two dimensional array, C. Data read from array A may be shaped based on attributes specified by a read shape and the result of MatrixScale, array C may be further processed based on attributes specified by a write shape prior to being written in device memory.

TABLE 6

```
Void MatrixScale( Array<float> C, const Array<float> A, float f, int
Width )
{
    int j = blockIdx.x*blockDim.y+threadIdx.y;
    for ( int i = threadIdx.x; i<Width; i+= blockDim.x )
        C[i,j] = A[i,j]*f;
}
```

In contrast, when conventional 32-bit pointers are used to access the segmented device memory, the code references the pointers, as shown in TABLE 7. Again, pointers are used to address the device memory and a two dimensional structure is imposed on the virtual address range.

TABLE 7

```
Void MatrixScale( float *out, const float *in, float f, int Width )
{
    float *outRow = out + Width*(blockIdx.x*blockDim.y+threadIdx.y);
    for ( int i = threadIdx.x; i<Width; i+=blockDim.x )
        outRow[i] = in[i]*f;
}
```

Figure 5:
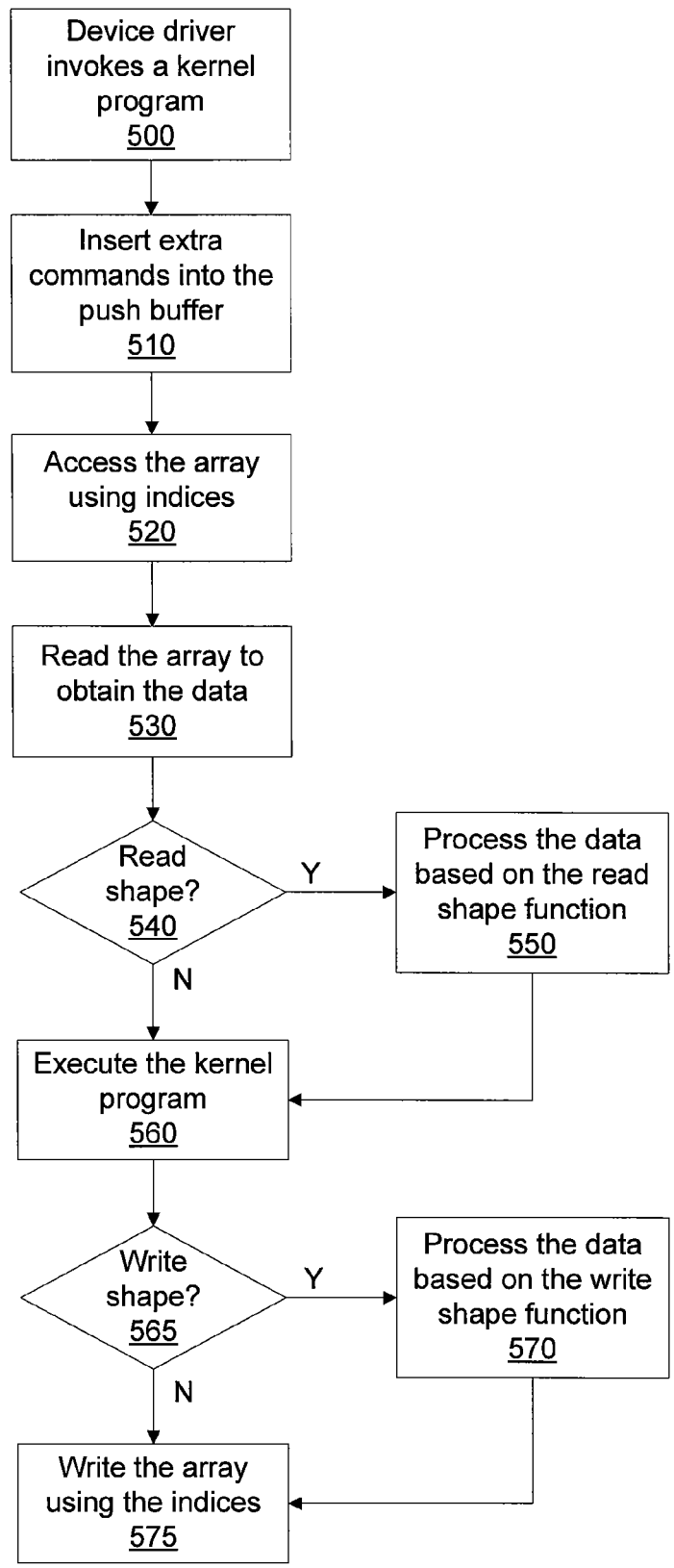
FIG. 5 is a flow diagram of method steps for executing a kernel and writing an array in accordance with one or more aspects of the present invention.

FIG. 5 is a flow diagram of method steps for executing a kernel program and writing an array, in accordance with one or more aspects of the present invention. Steps 500 through 560 correspond to steps 400 through 460 of FIG. 4 and are performed as described in conjunction with FIG. 4. In step 565, core(s) 208 determine if the results of kernel program should be shaped, i.e., processed based on attributes specified for the reference that is bound to array 205, before being written to array 205. Examples of shaping that may be specified include filtering functions, blending operations, associative operations (min, max, xor, and the like), compression, format conversion, anti-aliasing, and the like. If, in step 565 core(s) 208 determine that shaping is specified, then in step 570 core(s) 208 process the data based on the write shape function and proceed to step 575. Otherwise, core(s) 208 proceed directly to step 575 and write the results of kernel program to array 205.

The array interface provides a consistant method for accessing memory within a kernel program through the use of indices instead of conventional pointers or addresses. The indices are independent of the specific memory layout, so a proprietary memory layout may be used without changing any kernel programs that reference arrays using indices. When a read or write request is received from a core 208, memory interface 214 first performs any proprietary mapping and then completes a virtual to physical address mapping to produce a physical address for the read or write request. Additionally, none of the conventional 32-bit device address space is consumed by the arrays and the size of an array is not limited by the 32-bit device address space.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A method for executing a kernel program that writes an array stored in device memory, the method comprising:
   invoking the kernel program;
   inserting commands into a command stream for execution by a multithreaded processor that cause the kernel to correctly infer a location of the array in the device memory;
   executing the kernel program to produce data, wherein the produced data is formatted by the kernel program according to a write shape function specified by at least one command in the command stream; and
   writing, via an index, the array stored in the device memory to store the produced data in the array.

2. The method of claim 1, further comprising validating the index with a dimension of the array.

3. The method of claim 2, wherein the kernel program is configured to return a value of zero when the step of validating indicates that the index is not valid.

4. The method of claim 2, wherein the kernel program is configured to indicate an exception has occurred when the step of validating indicates that the index is not valid.

5. The method of claim 1, wherein the write shape function specifies a filtering operation to anti-alias the data.

6. The method of claim 1, wherein the write shape function specifies a compression operation.

7. The method of claim 1, wherein the commands define a layout of the array in the device memory.

8. The method of claim 1, wherein the data represents pixel fragment depth values.

9. The method of claim 1, wherein the kernel program inherits a memory segmentation state and does not obtain pointers to memory segments.

10. The method of claim 1, wherein a size of the array is not limited by a size of an address memory space of the device memory.

11. A computer readable storage medium containing a kernel program which, when executed by a computing device configures the computing device to perform a process to write an array stored in device memory, the process comprising:
   invoking the kernel program;
   inserting commands into a command stream for execution by a multithreaded processor that cause the kernel to correctly infer a location of the array in the device memory;

executing the kernel program to produce data that is formatted by the kernel program according to a write shape function specified by at least one command in the command stream; and writing, via an index, the array stored in the device memory to store the produced data in the array.

12. A method for conserving address space in device memory, the method comprising:

allocating segments of the device memory to an array and obtaining a handle corresponding to a location in the device memory where the array is stored, wherein a size of the array is not limited by a size of the address space;

binding a reference to the array, the reference including an attribute that controls how data stored in the array is interpreted by a multithreaded processor and a write shape function that controls how data to be stored in the array should be formatted;

executing a kernel program to produce the data, wherein the produced data is formatted according to the write shape function; and writing the data in the array by specifying an index to the array.

13. The method of claim 12, further comprising the step of creating a channel descriptor that defines a format of the data stored in the array.

14. The method of claim 13, wherein the channel descriptor includes a number of bits for each component of the data.

15. The method of claim 13, further comprising creating the reference that specifies the channel descriptor.

16. The method of claim 12, wherein the attribute is a dimensionality of the array that specifies a number of indices used to access the array.

17. The method of claim 12, wherein the attribute specifies processing that is performed by the multithreaded processor before the data is written to the array.

18. The method of claim 17, wherein the processing is blending of the data.

19. The method of claim 17, wherein the processing is compression of the data.

* * * * *